Aug. 19, 1969  P. W. VOGEL ET AL  3,462,280
METHOD OF PREPARING A CURED MEAT PRODUCT
Filed May 6, 1966
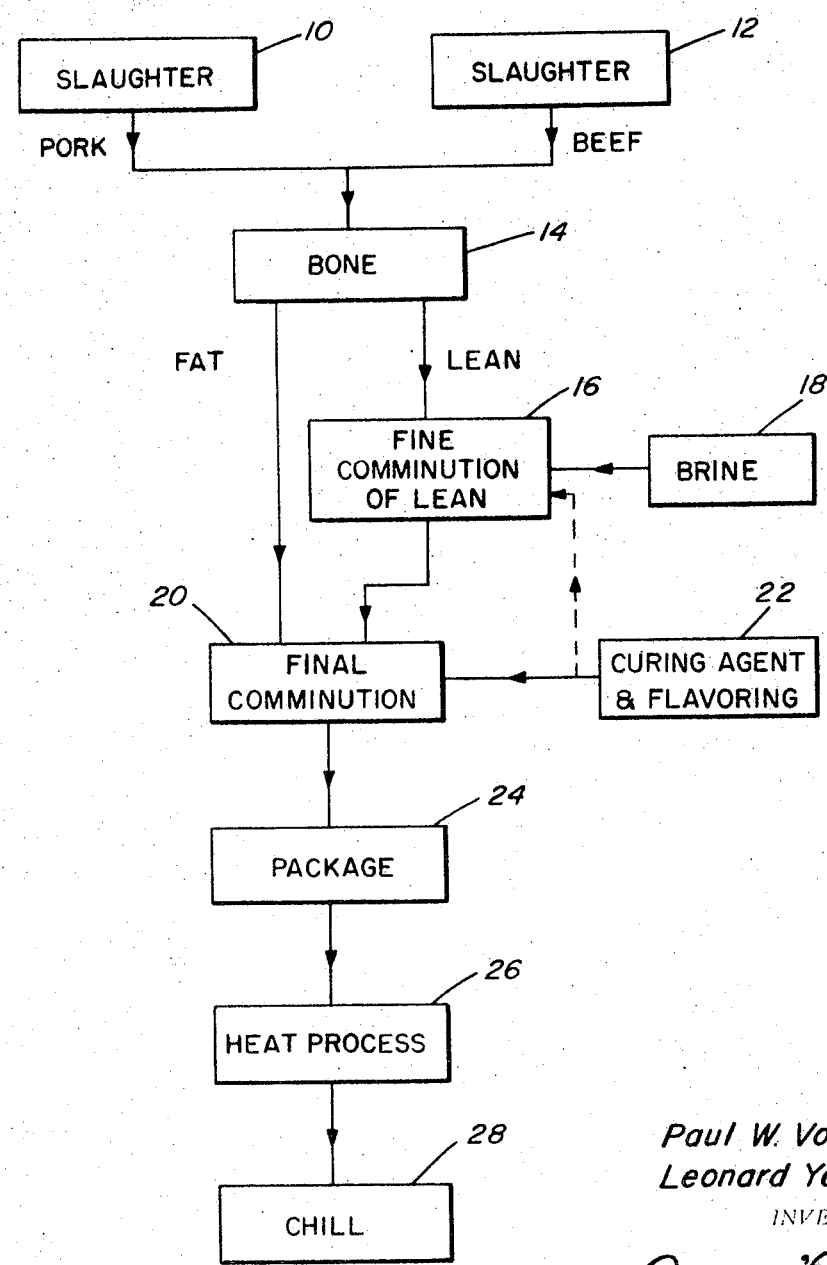
Paul W. Vogel
Leonard Yaiko
INVENTORS 3,462,280
METHOD OF PREPARING A CURED MEAT PRODUCT
Paul W. Vogel and Leonard Yaiko, Pekin, Ill., assignors to Bird Provision Co., a corporation of Illinois
Filed May 6, 1966, Ser. No. 548,207
Int. Cl. A23b 1/03; B65b 25/06
U.S. Cl. 99—159              6 Claims

ABSTRACT OF THE DISCLOSURE

Curing time for heat processed, packaged meat is accelerated by introducing the curing agents to the meat undergoing comminution while in a fresh state shortly following slaughter of the animals from which the meat is removed. The meat is either packaged while warm in an air impermeable material for subsequent cooking to develop the cure or prechilled and packaged in a porous material for immediate cooking.

---

This invention relates to meat preparing processes and more particularly to the preparation of meat products for consumer use which have been packaged, cured and cooked.

One of the problems encountered by meat processors in reconstituting or improving the color of cooked meat products, is the relatively long duration of the curing period during which the curing agents react with the meat pigments. It is therefore a primary object of the present invention to provide a meat preparing process wherein curing of the meat is substantially accelerated to thereby reduce processing time.

In accordance with the foregoing object, an additional object of the present invention is to provide a process wherein meat obtained from freshly slaughtered animals is comminuted while the meat is in a fresh state resulting in a meat emulsion capable of being rapidly cured during packaging and cooking without any long waiting period and costly chilling and handling operations.

A further object of the present invention is to provide a hot boning method for preparing packaged meat that is rapidly cured and heat processed resulting in a product that is stable and has improved flavor and color.

The important discovery of the present invention, is that a cured meat color may be rapidly developed while meat is subjected to heat processing temperatures if the meat is in a fresh state shortly after slaughter of the animal from which the meat is obtained. The rapid curing period which is less than 15 minutes in the process of the present invention compares favorably with existing curing methods as hereinbefore developed using standard curing ingredients.

The usual procedure followed in the meat packing industry involves chilling the animal carcass or boned products thereof after it is slaughtered and dressed. The meat is then withdrawn from frozen or refrigerated storage for processing requiring the introduction of water in the form of ice or brine in order to maintain the meat at a temperature below 65° F. during comminution to produce a stable emulsion. If curing agents are then introduced, the meat must undergo a curing period of substantial length or else subjected to moderate heat processing temperatures for several hours in order to permit the cure to develop. Contrary to the foregoing procedure, a hot boning method is followed in connection with the present invention as described for example in Patent No. 3,124,462, to Vogel et al., issued Mar. 10, 1964.

One possible explanation which accounts for the considerable decrease in curing time which results from the use of freshly slaughtered meat in accordance with the present invention, is the ability of such meat to consume entrapped oxygen within a limited period of time as described in the aforementioned patent. It is known that entrapped oxygen in a meat emulsion slows down the curing reaction and decreases the stability of the cured product. Thus, the comminution of the meat while it is in a fresh state may account for its tolerance of entrapped air and the development of cured color within minutes while the meat is subsequently subjected to heat processing temperatures.

Referring now to the drawing, a work flow diagram is shown illustrating a typical handling procedure in accordance with the present invention. Meat in the form of pork and beef is obtained from freshly slaughtered carcasses delivered from the slaughter stations 10 and 12 to the boning station 14. The freshly slaughtered carcasses undergo the conventional treatment including scalding, dehairing, singeing and evisceration before the meat is removed from the carcasses and divided into cuts and trimmings as well as into lean and fat components. The carcasses are bonded immediately after slaughter so that while the meat is still in a fresh state, it may be comminuted to form a meat emulsion. The lean components are delivered from the boning station 14 to the station 16 at which it is finely comminuted for approximately two minutes by means of a chopper into which a brine solution 18 is introduced. The balance of the meat components together with the comminuted lean components from station 16, are finally comminuted by a chopper at station 20. The meat is chopped at the station 20 for three or four minutes. The curing agents and flavoring 22 are added at any time during comminution whether it be at station 16 or station 20. Thus, the curing period is initiated while the meat is being comminuted at station 20. The comminuted meat is then stuffed and packed within packaging material such as "Saran" or cellulose weiner casings at packaging station 24. After packaging, the meat is cooked at station 26 wherein it is heat processed in a 250° to 300° F. chamber for example, until the meat reaches an internal temperature of approximately 160° F. While the meat is cooking, a full cure develops within minutes. The product after being heat processed is then removed from the heating chamber and rapidly chilled at station 28 after which it is finally packaged for consumer use.

In carrying out the method of the present invention, elapsed time and internal temperatures of the meat as it progresses from the slaughter station to the finished product, are critical factors although the actual time and temperature values may vary considerably dependent upon plant and equipment conditions and ambient air conditions. It will be appreciated for example that performance of the method steps within wider time and temperature limits may be possible where certain operations are performed under vacuum. Also, in performing the method of the present invention it has been found that a suitable curing agent consists of a compound of nitrite and a salt of ascorbic acid such as sodium erythorbate. Where the meat emulsion has a finishing temperature above approximately 65° F. to 70° F. or where the meat is to be heat processed in air impermeable casings, salts (sodium chloride) must be added in the form of brine. Also, the pH value of the meat must be above approximately 6.0 before comminution as a further condition.

The following charts are specific examples of ingredients and procedural steps utilized in accordance with the present invention producing cured and cooked meat products consisting of a mixture of beef and pork.

Example I

A. Ingredients:                                    Quantity
   (1) Beef _____lbs__ 20
   (2) Pork _____lbs__ 80
   (3) Brine:
      (a) Water _____lbs__ 10
      (b) Salt _____lbs__ 1.75
   (4) Curing agents:
      (a) Sodium nitrite _____grams__ 7.0
      (b) Sodium erythorbate _____do____ 20.0
   (5) Flavoring _____ozs__ 7.75
   (6) Air impermeable packaging material (Saran).

| B. Steps | Elapsed time (min.) | Temp. (° F.) |
|---|---|---|
| 1. Slaughter | 45 | |
| 2. Boning | 60–75 | 100 |
| 3. Comminution | 90 | 92 |
| 4. Packaging | 100 | 90 |
| 5. Heat processing | 110 | 90–160 |
| 6. Chilling | 130 | |

Example II

A. Ingredients:                                    Quantity
   (1) Beef _____lbs__ 20.0
   (2) Pork _____lbs__ 80.0
   (3) Brine:
      (a) Water _____lbs__ 15.0
      (b) Salt _____lbs__ 1.75
   (4) Curing agents:
      (a) Sodium nitrite _____grams__ 7.0
      (b) Sodium erythorbate _____do____ 20.0
   (5) Flavoring _____ozs__ 7.75
   (6) Cellulose packaging material.

| B. Steps | Elapsed time (min.) | Temp. (° F.) |
|---|---|---|
| 1. Slaughter | 45 | |
| 2. Boning | 60–75 | 100 |
| 3. Chilling | 90 | 30 |
| 4. Comminution | 130 | 40–50 |
| 5. Packaging | 140 | 55 |
| 6. Heat processing | 150 | 55–160 |
| 7. Chilling | 170 | |

In connection with Example I, it will be observed that the boned meat products are comminuted while they are above 70° F. or before the meat declines in temperature below 70° F. contrary to what was thought to be an upper limit above which a stable emulsion is not possible. The stability of the emulsion obtained from comminution at such temperatures, is possible only because of the freshness of the meat or the relatively short period of time following slaughter when comminution is begun. It is essential however that the salt be added by means of a brine solution before or during comminution if the resulting product is to be heat processed in air impermeable material. The only other critical factor is that the pH value of the meat be above approximately 6.0 before comminution as aforementioned. As to Example II, it will be noted that the meat is comminuted below 65° F. after the elapse of 130 minutes because of the preceding chilling step and that the packaging material is cellulose.

From the foregoing description, it will be appreciated that the method of the present invention is unique in that it eliminates the waiting period for completion of curing. Accordingly, meat may be processed in accordance with the present invention in a continuous flow system from live animal to finished product within a relatively short period of time eliminating various handling, storing and chilling operations. Also, the basic principles of the method could be applied to several variations of the procedures specifically set forth as Examples I and II hereinbefore. For example, after the meat emulsion is sealed within an air impermeable casing, it could be stored at a low storage temperature for a prolonged period before cooking because of the ability of the product to retain its freshness and flavor as set forth in the aforementioned Patent No. 3,124,462. Where the comminuted meat is packaged in a porous casing, it could be smoked in addition to being cooked. The porous casing being made of material commonly used for smoking purposes such as the cellulose packaging material referred to in Example II. In all cases, however, since emulsification is performed on meat which is freshly slaughtered, no coarse grinding of thawed meat need precede the fine comminution or chopping operation. In addition to the application of the present method to beef and pork, it could also be applied to other meats such as poultry as well as to ham in which case a warm brine solution containing curing agents is pumped or injected into the arteries immediately after hot boning of the carcass before the ham is sealed in an air impermeable casing or comminuted before packaging and then cooked in its packaged state.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of preparing a cured meat product from freshly slaughtered animal carcasses comprising the steps of: removing the meat from the animal carcass immediately following slaughter; comminuting the meat removed from the freshly slaughtered carcass within a limited period of time following slaughter producing a stable meat emulsion while said meat is still in a fresh state to accelerate subsequent curing; adding curing agents to the meat while being comminuted to initiate curing; packaging the meat upon completion of the comminution thereof; and heat processing the packaged meat to accelerate curing thereof.

2. The method of claim 1 wherein said curing agents consist of a nitrite compound and a salt of ascorbic acid.

3. The method of claim 1 wherein said meat is packaged in an air impermeable packaging material.

4. The method of claim 1 wherein said comminution of the meat is performed while the temperature of the meat is above 65° F. to produce said stable meat emulsion having a pH value above approximately 6.0.

5. The method of claim 1 wherein said meat is chilled to a temperature below 65° F. prior to said comminution thereof to obtain said stable meat emulsion.

6. In a hot boning method of packaging fresh, comminuted meat in an air impermeable packaging material for prolonged storage: adding within a limited period of time following slaughter curing agents to the fresh meat while the pH value thereof is above approximately 6.0 during comminution thereof as the temperature declines to approximately 65° F. for the reaction with the pigments in the fresh meat; packaging the fresh meat; cooking the packaged meat while said reaction progresses to completion at an accelerated rate; and chilling the packaged meat when the cooking thereof is completed substantially after the meat has been fully cured by reaction with the curing agents.

References Cited

UNITED STATES PATENTS

| | | | |
|---|---|---|---|
| 2,874,060 | 2/1959 | Turner et al. | 99—109 X |
| 3,033,687 | 5/1962 | Harper et al. | 99—109 |
| 3,124,462 | 3/1964 | Vogel et al. | 99—174 X |

HYMAN LORD, Primary Examiner

U.S. Cl. X.R.

99—109, 174